Nov. 10, 1925. Re. 16,208

A. WILD

WEAVING MACHINE

Original Filed Nov. 19, 1919 2 Sheets-Sheet 1

Inventor

Alfred Wild

By Ira M. Jones.

Attorney

Nov. 10, 1925. Re. 16,208

A. WILD

WEAVING MACHINE

Original Filed Nov. 19, 1919 2 Sheets-Sheet 2

Inventor:
Alfred Wild
By Ira M. Jones
Attorney

Reissued Nov. 10, 1925. Re. 16,208

UNITED STATES PATENT OFFICE.

ALFRED WILD, OF MILWAUKEE, WISCONSIN, ASSIGNOR TO HEYWOOD-WAKEFIELD COMPANY, OF BOSTON, MASSACHUSETTS, A CORPORATION OF MASSACHUSETTS.

WEAVING MACHINE.

Original No. 1,386,826, dated August 9, 1921, Serial No. 339,147, filed November 19, 1919. Application for reissue filed December 1, 1922. Serial No. 604,428.

*To all whom it may concern:*

Be it known that I, ALFRED WILD, a citizen of the Czechoslovak Republic, residing at Milwaukee, in the county of Milwaukee and State of Wisconsin, have invented new and useful Improvements in Weaving Machines, of which the following is a specification.

This invention relates to a certain new and useful weaving machine and method employed in connection therewith, more especially adapted for the weaving of baby carriage bodies and hoods, or any other type of goods woven of reed, fiber or the like.

Heretofore it has been the general practice to first weave the material into a fabric, then cut the fabric to a pattern and then stretch and shape the fabric to a body frame and tack the same thereto, or else weave the article directly upon the body frame by hand.

This manner of constructing reed, fiber or the like articles has proven very unsatisfactory from the standpoint of cost and the type of article produced as in applying the previously woven material considerable waste results in cutting the same to fit and in the weaving by hand experience has demonstrated that the weavers waste considerable material.

Furthermore, the product constructed of the previously woven material often times has swollen or raised uneven portions therein by reason of the material being woven in one shape and then unnaturally stretched to another shape.

With the above and other inherent objections in mind this invention has for an object to provide a weaving machine and method employed in connection therewith for weaving the material such as reed, fiber, or the like, directly onto a body frame or form to thus eliminate the forming of swollen or raised uneven portions in the finished article as well as all waste.

Another objectionable feature connected with the weaving of reed, fiber or the like articles by hand is the length of time involved and while the time element is somewhat reduced in the manufacture of the articles from previously woven material, it is still an important item in the cost thereof.

Therefore, it is another object of this invention to provide a machine for rapidly weaving the articles and which is capable of complete automatic operation as well as manual operation, if desired.

A further objection to hand woven articles is that the warps or stakes are not even throughout the article, thus being objectionable in appearance, and this invention has for a further object to provide guard or guide tubes extending over the warps or stakes to maintain the same straight and to eliminate breakage thereof and insure the smooth operation of the weaving the weft or strand between the stakes, irrespective of the type of material employed.

A still further object of the present invention is to provide means for pressing the weft or strand into place after the same has been interwoven between the warps or stakes and to also provide means for mechanically or electrically operating the warp carrying guide tube members as hereinafter described.

And a still further object of this invention resides in the provision of mechanical means for weaving reed, fiber or the like in any desired shape or form.

With the above and other objects in view which will appear as the description proceeds, my invention resides in the novel construction, combination and arrangement of parts, substantially as hereinafter described and more particularly defined by the appended claims, it being understood that such changes in the precise embodiment of the hereindisclosed invention may be made as come within the scope of the claims.

In the accompanying drawings, I have illustrated two complete examples of the physical embodiment of my invention constructed according to the best modes I have so far devised for the practical application of the principles thereof, and in which.

Figure 6:
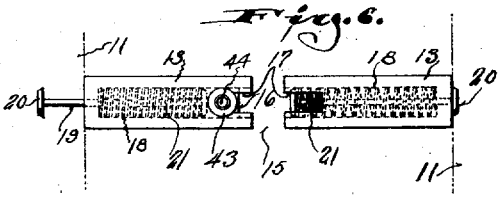
Figure 6 is an enlarged detail view of one of the block members.

Referring now more particularly to the accompanying drawings, the numeral 10 indicates a supporting frame preferably consisting of two spaced channel members 11 having their ends secured to pairs of supporting posts or standards 12. The frame 10 may be of various shapes according to the type of article for which it is especially designed, and has two series of opposed block members 13 secured to the top face of the channel irons 11 in axial alinement by suitable fastening means 14, see Figures 3 and 6.

The inner ends of the blocks of each series are arranged in spaced relation to provide an intermediate channel 15 extending along the frame, and normally disposed centrally of the channel 15 are a plurality of warp or stake guard or guide tube carrying members 16. One member 16 is carried by each alined pair of blocks 13 of the series and is movable out of channel 15 into a recess 17 formed in each block 13, as will be later described.

Each block 13 is centrally bored, as at 18, through which passes a guide rod 19 having its outer end enlarged, as at 20, and disposed outwardly of the block and its inner end disposed within the recess 17, a spring 21 being coiled about the guide rod within the bore and confined between a collar on the inner end of the rod and the outer end wall of the bore. By this structure each member 16 is normally urged to a position centrally of the channel 15, as will be at once seen, the head 20 preventing the rod 19 or spring 21 of one block from projecting into the channel when the member 16 is urged into the recess 17 of the adjacent opposed block, by the means to be later described.

In operation, the body, hood, basket, or other article, frame, or form, which is conventionally illustrated in the drawings in the form of a baby carriage body 22, hereinafter termed a templet body is clamped or otherwise secured to a base (not shown) mounted on the upper end of a jack screw 23. The jack screw is mounted in a tubular standard 24 for vertical movement and is engaged by an internally threaded nut 25 provided with peripheral ratchet teeth 26 for automatically lowering the jack screw, and consequently the templet body, step by step, as hereinafter described. Stakes or warp members 27 are inserted in warp or stake guard or guide tubes 28 and have their lower ends secured to the dowels (not shown) of the templet body 22, in any suitable manner, preferably by being inserted in openings drilled in the templet body. The guard or guide tubes are preferably connected with the members 16 by flexible portions 29, whereby the sidewise or lateral movement thereof is unhindered.

Figure 3:
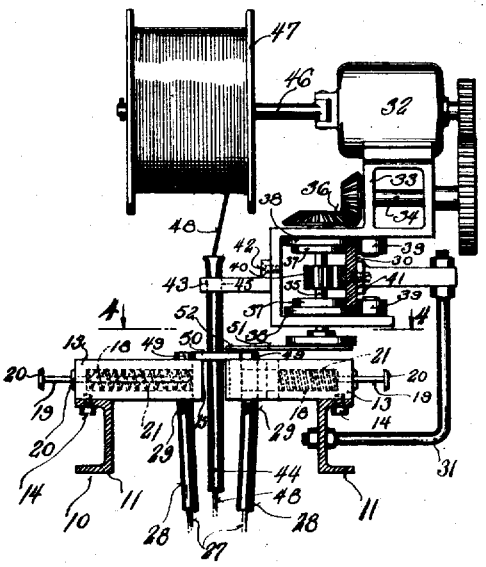
Figure 3 is a sectional view taken transversely through one arm of the supporting frame on the line 3—3 of Fig. 2.
Figure 4:
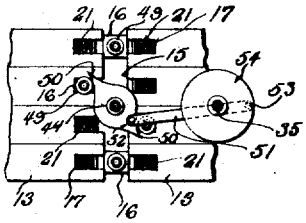
Figure 4 is a fragmentary detail view taken on the plane indicated by the line 4—4 of Fig. 3.

Disposed about the inner series of blocks 13 is a track 30 shaped to correspond with that of the frame 10, to the inner channel 11 of which it is secured by bracket arms 31, see Fig. 3. Mounted on the track for movement therealong is an operating motor 32 carried by a support or carriage 33 in which is journaled a horizontal shaft 34 in geared connection with the motor and a vertical shaft 35 in geared connection with shaft 32. Freely journaled upon shaft 35 are two sets of guide wheels 37 and 38, wheels 37 engaging the outer face of the track and wheels 38 engaging longitudinal edges thereof, and two guide wheels 39 engage the rear face of the track to thus freely, movably mount the support or carriage thereon.

In order that the carriage may be readily moved about the frame 10, a gear pinion 40 is fixed upon shaft 35 and is meshed with a gear rack 41 carried by the outer face of the track. Secured to the carriage, as at 42, is an arm 43 which projects over the channel, between the sets of blocks, and has secured therein the upper end of a weft or strand guide tube 44 which extends downwardly to a point adjacent the lower ends of the guard or guide tubes 28. Guide tube 44 is capable of a slight lateral swinging movement by reason of the flaring opening 45 in which it is secured, but it is held rigid against longitudinal swinging movement.

Secured to the housing of motor 32 is a supporting shaft 46 for a drum or spool 47 upon which is wound the weft or strand 48 which extends downwardly through the guide tube 44 and is interwoven between the warps or stakes 27 in the manner hereinafter described. However, it will be appreciated that the weft or strand drum may be independent of the carriage.

Each member 16 has a roller 49, journaled on its upper face provided with a central aperture communicating with the bore of the guide tube 28. The rollers are adapted to be engaged by a cam member 50 journaled upon the weft or strand guiding tube 44. The cam 50 is adapted to be rocked by a pitman or connecting rod 51, one end of which is pivoted to the cam member, as at 52, and the other end of which is secured to a crank pin 53 carried by a disk or wheel 54 mounted on the lower end of shaft 35.

From the foregoing description taken in connection with the accompanying drawings, it will be apparent that as carriage 33 moves along track 30, cam 50 is rocked causing its leading pointed end 50′ to engage behind the next roller 49 and move the adjacent member 16 in one direction as for example, inwardly, and as the carriage is advanced the distance between the blocks the member 16 which has been moved inwardly will then be engaged by the rear end 50′ of the cam and the next member 16 will be moved outwardly. With the adjacent warps or stakes 27 staggered the weft or strand 48 is laid therebetween and as the carriage 33 progresses the members 16 are alternately moved first in one direction and then in another.

When the carriage 33 has reached one end of the track, it is reversed and travels back over the track again alternately moving the members 16 in opposite directions and laying the weft or strand therebetween to accomplish the weaving as will be obvious.

Figure 1:
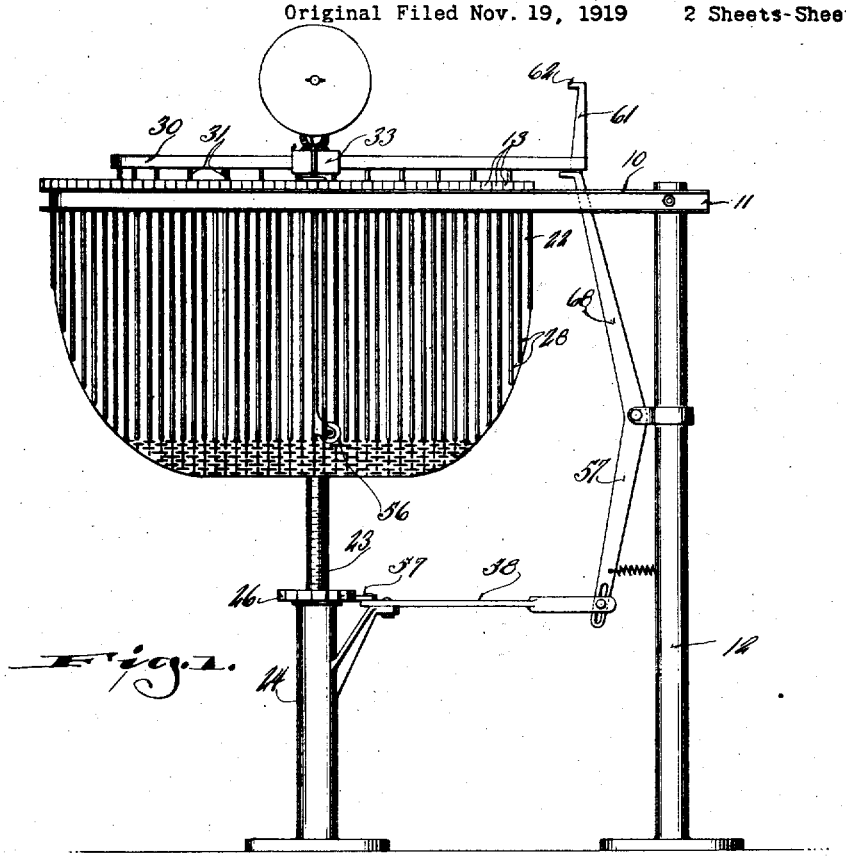
Figure 1 is a side view of a baby carriage body weaving machine embodying the features of my invention.
Figure 2:
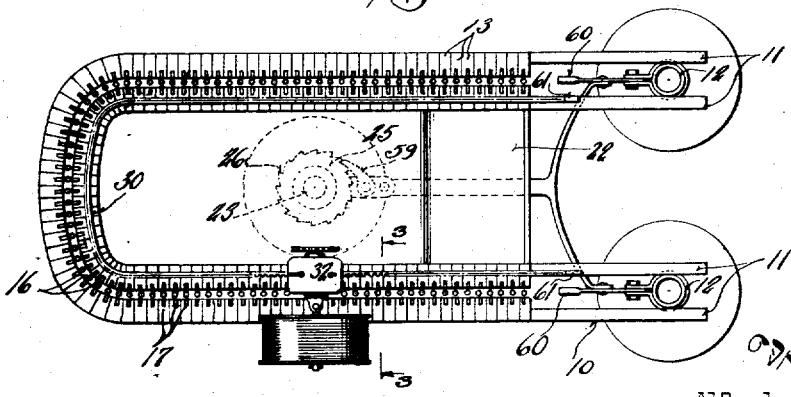
Figure 2 is a top plan view thereof.

In order that the weft or strand 48 will be alternately woven on the opposite sides of each warp or stake, I preferably employ an uneven number of warps and the effect will be that each end stake, or the end dowel of the templet body will have the weft coiled therearound. In order to insure the topmost weft or strand engaging the weft or strand thereunder, I provide a presser finger or wheel 56 which is carried by the carriage 33 or the guide tube 44 and presses the same down, see Fig. 1.

As it is necessary to drop or lower the frame or form 22 the distance of the thickness of the weft or strand after each complete operation of my device, a bell crank lever 57 is pivoted to the standards 12, the lower end of which is engaged with a slidably mounted bar 58 having a dog 59 engageable with the ratchet teeth 26 of nut 25, the upper ends of arms 60 formed on said bell crank lever being engaged by the carriage 33 when it reaches either limit of movement to rotate the nut 25 and consequently lower the templet body 22.

At each end of the track, I provide a stop 61 to prevent the carriage from running thereoff, and said stop carries a switch 62 for reversing the direction of rotation of motor 32 when the carriage engages the stop, and as this specific structure forms no important part of my invention except in the combination set forth, the same has been illustrated without its electric connections. However, in the event the track is continuous the stops may be dispensed with.

Figure 5:
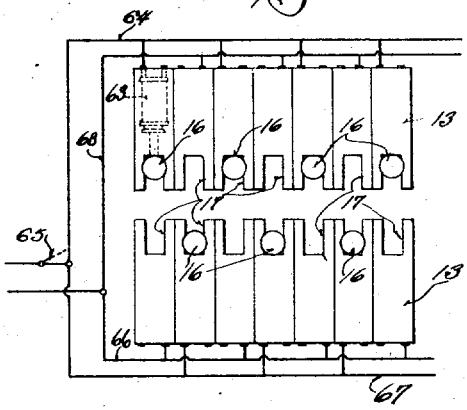
Figure 5 is a partly diagrammatic view illustrating my invention as adapted for operation by a plurality of electric magnets.

In place of the cam 50 for moving the members 16 in opposite directions to accomplish the weaving of the weft or strand with the warps or stakes, electromagnets 63 may be employed as best illustrated in Fig. 5, the magnets of every other block 13 of one series having their positive ends connected, by a wire 64, with a switch 65 disposed at one end of the track 30 and the negative ends of the magnets of the blocks 13 opposite the members having their positive ends connected by wires 64 are connected by a wire 66 leading to another point of the switch 65. The positive ends of the magnets intermediate the magnets having their negative ends connected by the wire 66 are connected by a wire 67 with the wire 64 and the negative ends of the magnets opposite the magnets having their positive ends connected by a wire 67 are connected with the wire 66 by a wire 68. By this construction the members 16 will be staggered as depicted in Fig. 5, when the switch 65 is closed and thus the carriage 33 may be run around the frame 10 at a greater speed than with the structure hereinbefore described and when the same reaches the end of the frame opposite the end having a switch 65 the same engages a switch similar to switch 65 (not shown) reversing the connections with the magnets 63 and oppositely staggering the members 16 so that the carriage 33 may run around the frame and dispose the weft or strand 48 properly between the warps or stakes.

From the foregoing description taken in connection with the acompanying drawings, it will be at once apparent that I provide a comparatively simple machine for weaving baby carriage bodies, hoods, and other articles and that by providing the guide tubes 28 for the warps or stakes the same may be employed for any kind of material as the warps 27 have their outer sides smooth and thus no friction is caused by the weft or strand sliding therebetween. It will also be seen that I weave direct upon the templet body whereas heretofore the material has been woven separately and then shaped and placed over the templet body, or else woven by hand.

What I claim as my invention is:

1. A weaving machine comprising means for supporting a templet body having a plurality of spaced warp members all fixed at one of their ends thereto, a plurality of carrying members for said warp members and in which the other ends of the warp members engage, there being a carrying member for each warp member, and means for interweaving a weft between said warp members by inserting said weft from those ends of the warp members engaged in said carrying members.

2. A weaving machine comprising means for supporting a templet body having a plurality of spaced warp members all fixed at one of their ends thereto, a plurality of carrying members for said warp members and in which the other ends of the warp members engage, there being a carrying member for each warp member, means for staggering the warp carrying members, and means for interweaving a weft between said warp members by inserting said weft from those ends of the warp members engaged in said carrying members, while said carrying members are in staggered relation, whereby the woven material takes the form of the templet body.

3. A weaving machine comprising means for supporting a templet body having a plurality of spaced warp members all fixed at one of their ends thereto, a plurality of carrying members for said warp members and in which the other ends of the warp members engage, there being a carrying member for each warp member, means for staggering the warp carrying members, means for interweaving a weft between said warp members by inserting said weft from those ends of the warp members engaged in said carrying members, while said carrying members are in staggered relation, and means for pressing the weft downwardly after the same has been interwoven between the warp members whereby the fabric is formed to the shape of the templet body.

4. A weaving machine comprising means for supporting a templet body having a plurality of spaced warp members all fixed at their bottom ends thereto, a plurality of carrying members for said warp members and in which the top ends of said warp members engage, there being a carrying member for each warp member, means for supporting the top ends of said warp carrying members, means operating upon said top ends of said carrying members for staggering them, means for interweaving a weft between said warp members by inserting said weft from the top ends of the warp members engaged in said carrying members, while said carrying members are in their staggered relation, and means to provide a change in the relative positions of the bottom ends of said warp carrying members with respect to the bottom of the templet body after each operation of the weft interweaving means whereby a fabric is woven to the shape of the templet body.

5. A weaving machine comprising a supporting frame, means for supporting a body form disposed below the same which body frame has a plurality of spaced warps fixed at their bottom ends thereto so as to extend upwardly therefrom, a carrying member for and in which the top end of each warp is arranged, said carrying members being supported by said frame and disposed against the sides of said body form, and means travelling along the supporting frame for interweaving a weft between the warps carried by said members.

6. A weaving machine comprising a horizontally disposed supporting frame having a centrally disposed channel therein, a plurality of tubes forming warp carrying members disposed in said channel, there being a tube for each warp, a weft carrying member mounted on said frame to travel in a path coincident with said channel, and means for staggering the warp carrying members to one side or the other of said channel whereby the weft carried by said weft carrying member may be interwoven between the warps in said warp carrying members.

7. A weaving machine comprising a supporting frame, a body form disposed therebeneath, warp carrying members mounted on the frame and having warps disposed against the body form side, a track disposed above the warp carrying member, a weft carrying member mounted on the track, and means for interweaving a weft carried by said weft carrying member with the warps.

8. A weaving machine comprising a horizontally disposed supporting frame, a body form disposed beneath the same, said supporting frame having a channel therein corresponding to that of said body form, an adjustable support beneath said frame and upon which said body form is mounted, a plurality of spaced warps fixed at their bottom ends to said body form and extending upwardly therefrom, a plurality of tubular carrying members, one for each warp, and in which the top ends thereof are disposed, said members being arranged in said channel, a weft carrying member movable about the frame in a path coincident with said channel for interweaving a weft between said warps carried by said members, and automatic means operable when the weft carrying member reaches each end of its path of movement to actuate said adjustable support to cause a relative movement between said support and said supporting frame.

9. A weaving machine comprising a supporting frame, two series of spaced blocks carried thereby, warp carrying members carried by the adjacent blocks of the series and normally disposed in the space therebetween, a weft guiding tube movable along the space between said series, and means for moving adjacent warp carrying members in opposite directions.

10. A weaving machine comprising a supporting frame, two series of spaced blocks carried thereby, warp carrying members carried by the adjacent blocks of the series and normally disposed in the space therebetween, a weft guiding tube movable along the space between said series, and means mounted on said weft guiding tube for moving adjacent warp carrying members in opposite directions.

11. A weaving machine comprising a supporting frame, two series of spaced blocks carried thereby, warp carrying members carried by the adjacent blocks of the series and normally disposed in the channel formed between the series, a warp guide tube carried by each of said warp carrying members, a carrier movable about said supporting frame, a weft guiding tube carried thereby and projected downwardly through the channel between the series of blocks, and means mounted on said weft guiding tube for moving adjacent warp guiding members in opposite directions out of said channel.

12. A weaving machine comprising a supporting frame, two spaced apart series of blocks secured thereto, said blocks having their inner faces recessed, a warp guide tube carrying member carried by each adjacent pair of blocks and movable into the recess of either block, a track mounted about the supporting frame, a carrier mounted on said track and movable therealong, a weft guide tube carried by said carrier and projected downwardly between the series of blocks, and means mounted on said weft guide tube and engageable with said warp guide tube carrying members whereby said warp guide tube carrying members are moved into the recesses of the blocks as the guide tube is moved through the space between the series of blocks.

13. A machine of the class described, comprising a supporting frame, a plurality of warp carrying members carried thereby, means yieldably holding said members in a mid position, a weft carrying member mounted to travel along the frame, means for moving the weft carrying member along the frame, and means carried by the weft carrying member for moving said warp carrying members transversely from mid position to stagger the same whereby weft carried by said weft carrying member may be interwoven between the warps carried by the warp carrying members.

14. A machine of the class described, comprising a supporting frame, a plurality of warp carrying members carried by said frame, a supporting track carried by said frame, a carriage member mounted to travel back and forth on said track, a weft carrying member carried by said carriage member, means for moving said carriage along the frame, means mounted on said weft carrying member and operable as said carriage is moved along the frame for staggering the warp carrying members whereby weft carried by said weft carrying members may be interwoven between the warps.

15. A machine for weaving bodies comprising a substantially U-shaped supporting frame, a plurality of warp carrying members carried by the supporting frame, a weft carrying member movable along the supporting frame, means for moving weft carrying members along the supporting frame in one direction, means for staggering the warp carrying members and the warps carried thereby upon such movement of the weft carrying member whereby the weft carried by the weft carrying member may be interposed between the warps, means for automatically reversing the direction of movement of the weft carrying member along the frame upon its reaching its limit of movement, and means for reversing the staggering of the warp carrying members upon reverse movement of the weft carrying member.

16. A machine of the class described, for the production of a stake and strand fabric embodying therein, a horizontally disposed supporting frame, a templet body spaced below the same, said frame having a channel coinciding with the plan outline of said body, a plurality of members supported upon said frame within the channel and slidable to one side or the other thereof, there being one of said members provided to receive each stake and to position it in weaving relation to said templet body, means for yieldingly holding said members in a predetermined position in said channel, and means for weaving said members to one side of said channel to stagger them and insert a filler strand therebetween, whereby the fabric is formed to the shape of the templet body.

17. A machine of the class described, for the production of a stake and strand fabric embodying therein, a horizontally disposed supporting frame, a templet body spaced below the same, said frame having a channel coinciding with the plan outline of said body, a plurality of members supported upon said frame within the channel and slidable to one side or the other thereof, there being one of said members provided to receive each stake and to position it in weaving relation to said templet body, means for yieldingly holding said members in a predetermined position in said channel, means for moving alternate stake receiving members transversely of said channel to stagger them, means for interweaving a filler strand between said staggered stakes and means for packing the filler strand whereby the fabric is formed to the shape of the templet body.

In testimony whereof I affix my signature.

ALFRED WILD.